July 14, 1936.　　　L. THÉREMIN　　　2,047,912
TIMING SYSTEM
Filed Dec. 1, 1933　　　6 Sheets-Sheet 1

July 14, 1936.    L. THÉREMIN    2,047,912
TIMING SYSTEM
Filed Dec. 1, 1933    6 Sheets-Sheet 4

INVENTOR
Leon Theremin
BY
M. Boyd Zinman
ATTORNEY

July 14, 1936.   L. THÉREMIN   2,047,912
TIMING SYSTEM
Filed Dec. 1, 1933   6 Sheets-Sheet 6

INVENTOR
Leon Théremin
BY M. Boyd Zinman
ATTORNEY

Patented July 14, 1936

2,047,912

UNITED STATES PATENT OFFICE 2,047,912

TIMING SYSTEM

Leon Théremin, New York, N. Y., assignor to M. Boyd Zinman, Emanuel B. Morgenstern, and Leon Theremin, all of New York, N. Y.

Application December 1, 1933, Serial No. 700,446

19 Claims. (Cl. 171—97)

This invention relates to timing and time indicating devices and aims to provide a novel method of and means for operating said timing and time indicating devices, including synchronous electric clocks, on direct current power.

At present, synchronous electric clocks can be used in those districts or locations only to which standardized frequency alternating current power is supplied.

The purpose of the present invention is to provide a synchronous electric clock which might be run from the direct current power lines. Another purpose of the present invention is to provide a unit which, if used in connection with a commercial synchronous alternating current electric clock, will make it possible to run said clock on direct current power.

In the existing systems, alternating current synchronous electric clocks employ a synchronous motor or a synchronous brake. A motor turns the hands of the clock through a system of gears, and the frequency of the illuminating power line is controlled so as to have a sample electric clock, located at the power station, to run at the same speed as a standard astronomical clock.

The revolutions of the motor employed are in fixed relationship to the number of cycles of the power supplied, and therefore, the existing electric clocks are very accurate.

It is possible to operate a similar electric clock on the direct current power lines, if use is made of the alternating current component of the direct current power. In the district of Manhattan, of the State of New York, for example, only one company supplies direct current to apartment houses, business establishments and manufacturing plants. The said direct current power is produced by 25 cycle rotary converters. The substantial part of this 25 cycle power is obtained from frequency changers which are fed from the 60 cycle power lines. The 25 cycle system forms one interconnected network, and there is no such time when this 25 cycle network is disconnected from the 60 cycle to 25 cycle frequency changers. The frequencies of the alternating current components of the ripple in the direct current power, which include 150 cycles and other frequencies which are substantially multiples of 25 have a constant and definite relationship to the 60 cycle system frequency, which as heretofore explained, is controlled by an astronomical clock.

An electric clock will show correct time if run on the alternating current component ripple of the direct current line, wherever the frequency of the alternating current system is controlled through comparison with an astronomical clock, and where the direct current system is at some point coupled to the alternating current system through the frequency changers and the rotary converters.

Different methods of attaining the desired result are diagrammatically illustrated in the accompanying drawings. These methods are equally effective, but one particular method, or another can be more useful from the viewpoint of a given manufacturer.

Other methods of realizing the same results, not shown here, are possible and the method of the present invention, in being quite general, is not restricted to only the particular embodiments of the method illustrated by way of example in the accompanying drawings.

Figure 1:
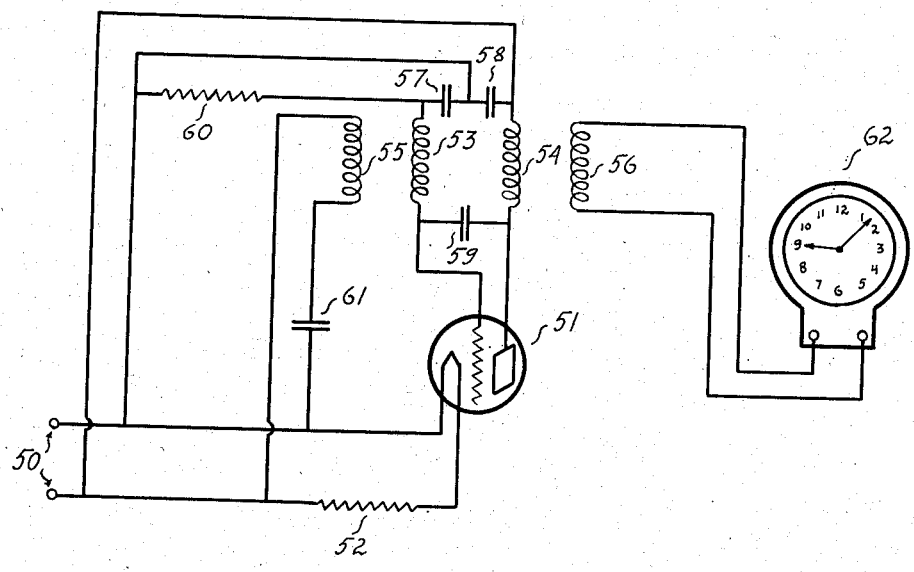
Fig. 1 is a diagram illustrating a highly simplified electrical circuit and method of constructing a unit which can be connected to the existing alternating current electric clock, in order to have said clock to operate correctly on the direct current power lines.

Referring to the diagram of Fig. 1, an electromagnetic system of low-frequency oscillation potential is shown, comprising an apparatus which can be used in running a standard 60 cycle synchronous electric clock on the direct current power lines. Direct current power is supplied to the terminals 50, the lower terminal being positive, substantially as indicated.

The electronic oscillator tube 51 has its heater, in series with a non-inductive resistance 52, connected to said terminals 50, the said non-inductive resistance 52 serving to limit the heater current of said tube 51 to the normal value.

Associated with said electronic oscillator tube 51 inductive impedances 53 and 54, blocking condensers 57 and 58 and 59, connected, substantially as indicated by the diagram of the drawings, between the plate and the grid circuits of said tube 51, and other parts connected to or occupied therewith, is tuned to very nearly the 60 cycle frequency.

In the apparatus represented by the diagram of the figure, coils 53, 54, 55 and 56 are inductively coupled to each other, and the four-winding transformer thus formed might be of either the air core or of the iron core type, and can have nearly 100 percent or any other percentage couplings between the above-mentioned four windings.

The plate potential is supplied to said oscillator tube 51 from the positive terminal of the line, through the ohmic resistance of the inductive impedance winding 54, and the grid is connected to the cathode circuit through the grid leak resistor 60 in series with the winding 53, substantially as indicated.

The midpoint between the blocking condensers 57 and 58 is grounded to the cathode. The series circuit formed by the transformer winding 55 and the high capacity blocking condenser 61 is connected across the power supply. Transformer winding 56 is connected across the terminals of a synchronous electric clock of the usual 60 cycle alternating current type 62, substantially as indicated by the diagram of the drawings.

The alternating current components, or ripple frequencies, present in the direct current power, are impressed upon the aforementioned transformer winding 55, after passing through the aforesaid high capacity blocking condenser 61. Due to the said transformer winding 55 being, as heretofore described, inductively coupled with oscillating circuit of the tube 51, the higher frequency signal in the said transformer winding 55 affects the period of oscillation of said oscillating circuit of said tube 51.

It has been experimentally demonstrated by the inventor that, although the said oscillator tube 51, in conjunction with its oscillating circuit, is originally designed to oscillate at approximately the 60 cycle frequency, and the ripple frequencies introduced in the winding 55 are substantially multiples of 25 (frequency used in converting the alternating into direct current power), the said ripple frequency signal will influence or "pull-in" the electric oscillations of the circuit of the oscillator tube 51 in such a manner as to have the total number of cycles in the oscillations of the circuit of said oscillator tube 51, to equal exactly the total number of cycles in the 60 cycle frequency power system from which the 60/25 cycle frequency changers are operated and the frequency of which, as heretofore mentioned, is controlled by a standard astronomical clock.

The aforementioned pulling in or synchronizing effect has been further noticed by the inventor as in general existing between coupled vibrating systems of different frequency oscillations, or between a vibrating system and one creating pulsations, and is strongest in case the ratio of the frequency of oscillations or pulsations of the other system is very nearly a simple fraction or a harmonic ratio. When such is the case, the aforesaid "pulling-in" or a mode of automatic synchronizing action results in the frequency of one or both of said systems to be changed in such a direction or directions that, in the resulting substantially stable condition, the said ratio of one frequency to another, equals exactly the said simple fraction or harmonic ratio.

In the apparatus represented by the diagram of the figure, the frequency of the oscillations of the circuit of the oscillator tube 51 will be changed under the influence of the signal impressed upon said circuit by the winding 55, due to the above-mentioned "pulling-in" effect, and said change taking place in such a manner as to have the ratio of the frequency of the 25 cycle power, which is used in the rotary converters in converting alternating into direct current power, to said frequency of the oscillations of the circuit of the oscillator tube 51 to equal exactly the simple fraction 5/12, and the said "pulling-in" effect taking place between the said oscillations of the circuit of the oscillator tube 51 and one or more ripple components of the direct current power, the ripple component frequencies being substantially multiples of 25.

Power at the frequency of the oscillating circuit of the oscillator tube 51 is, therefore, suitable for use in running a standard 60 cycle synchronous electric clock.

The voltage induced in the winding 56 is impressed across the 60 cycle synchronous electric clock 62, the said winding 56, as heretofore explained, being inductively coupled with the oscillating circuit of said tube 51.

In the use of the apparatus, it is, furthermore, found that disturbing influences tend to destroy the synchronous harmonic coupling between the oscillations of the oscillating circuit of the tube 51 and the impulse impressed thereupon by the winding 55. Among the most common disturbing influences are static discharges and effects of power switching in the power distributing network. Due to their effect upon the degree of saturation of magnetic material and other effects, such influences tend to change momentarily the operation of the tube 51. In designing the instrument, therefore, it is found useful to intentionally set the natural frequency of the oscillations of the said circuit of the tube 51, slightly above or slightly below the true 60 cycle frequency, in order that those disturbing influences, which occur most commonly, will alter the natural frequency of oscillations of the oscillating system of the circuit of the tube 51 in such a direction as to bring the said natural frequency of oscillations numerically nearer the true 60 cycle frequency, thereby decreasing the probability of skipping a number of cycles due to the aforesaid disturbing influences. In the above discussion under the term "natural frequency of oscillations" we understand that potential frequency at which the oscillating system of the circuit of the tube 51 will oscillate normally if no impulses were impressed upon said circuit by the winding 55. Under the influence of said impulses, the actual frequency of the oscillations of said circuit of the tube 51 will always equal the true 60 cycle frequency which latter is checked by an astronomical clock in the 60 cycle power distributing system, as heretofore described.

Figure 2:
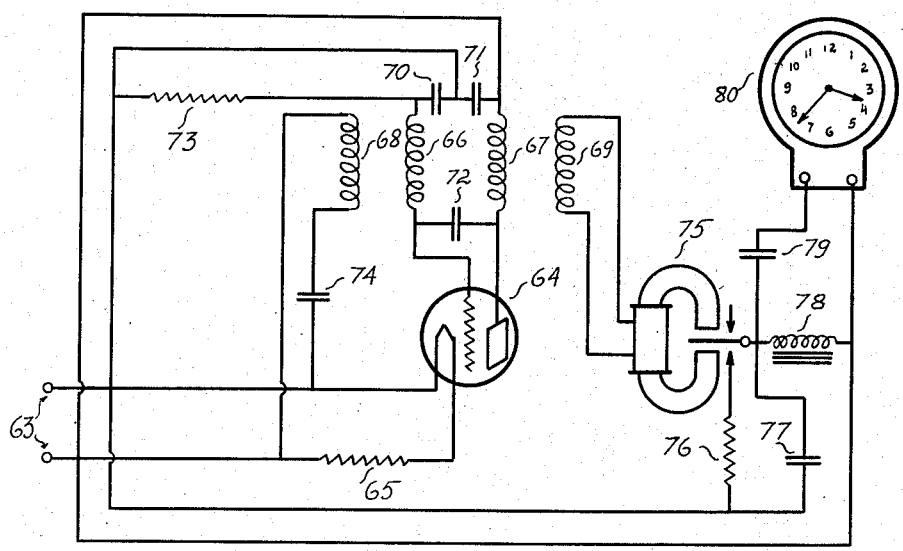
Fig. 2 is a diagrammatical illustration of a device similar to that represented in Fig. 1, and, in addition, utilizing a stage of amplification, operating in accordance with a novel principle involving a simple arrangement in the use of a vibrating relay.

The system shown in Fig. 2 is similar to that shown in Fig. 1 except that the output of the oscillator is amplified in a novel arrangement of a vibrating relay with its associated circuit including resistance, inductance and capacitance units. Direct current power is supplied to the terminals 63. The electronic oscillator tube 64 has its heater, in series with a non-inductive resistance 65, connected to said terminals 63, substantially as indicated, the said non-inductive resistance 65 serving to limit the heater current of said tube 64 to the normal value.

Associated with said electronic oscillator tube 64, inductive impedances 66 and 67, blocking condensers 70 and 71 and condenser 72, connected between the plate and the grid circuits of said tube 64, comprise an oscillator circuit, which, in combination with said tube 64 and other parts coupled therewith, is tuned to very nearly the 60 cycle frequency.

In the apparatus represented by the diagram of the figure coils 66, 67, 68 and 69 are inductively coupled to each other, and the four-winding transformer thus formed might be of either the air core or of the iron core type, and can have nearly 100 percent or any other percentage couplings between the aforementioned four windings. The plate potential of said oscillator tube 64 is supplied from the positive terminal of the line, through the ohmic resistance of the inductive impedance winding 67, and the grid is connected to the cathode circuit through the grid leak resistor 73 in series with the winding 66, substantially as indicated.

The midpoint between the blocking condensers 70 and 71 is grounded to the cathode. The series circuit formed by the winding 68 and the blocking condenser 74 is connected across the power supply. Transformer winding 69 is connected across the coil of the polarized relay 75.

Referring to the diagram of the figure, direct current power is impressed across the series circuit formed by the condenser 77 and the inductive impedance 78, substantially as indicated. The 60 cycle signal impressed by the transformer winding 69 upon the coil of the polarized relay 75, causes said polarized relay 75 to intermittently connect the non-inductive resistor 76 across the condenser 77, the ohmic resistance of said non-inductive resistor 76 being chosen such as to have the minimum of sparking at the contacts of said polarized relay 75, and being of the value, otherwise suitable for the proper action of the apparatus.

The shorting of the condenser 77 through the non-inductive resistor 76 by the relay 75, at the rate of 60 times per second, and the consequent discharging of said condenser 77 through the said non-inductive resistor 76, causes a 60 cycle alternating current electromotive force to be impressed upon the circuit formed by the said condenser 77, the inductive impedance 78 and the power source. When the values of the inductance and the capacity in said circuit are chosen properly, a condition arises, which can be compared with resonance in an alternating current system, at which point, the R. M. S. value of the 60 cycle alternating current voltage existing between the terminals of the inductive impedance 78 might be in excess of the direct current voltage supplied by the power source. In the apparatus represented by the diagram of the drawings, the constants must be chosen of such value that substantially 110 volts at 60 cycles will be delivered to the synchronous electric clock 80 through the blocking condenser 79.

Figure 3:
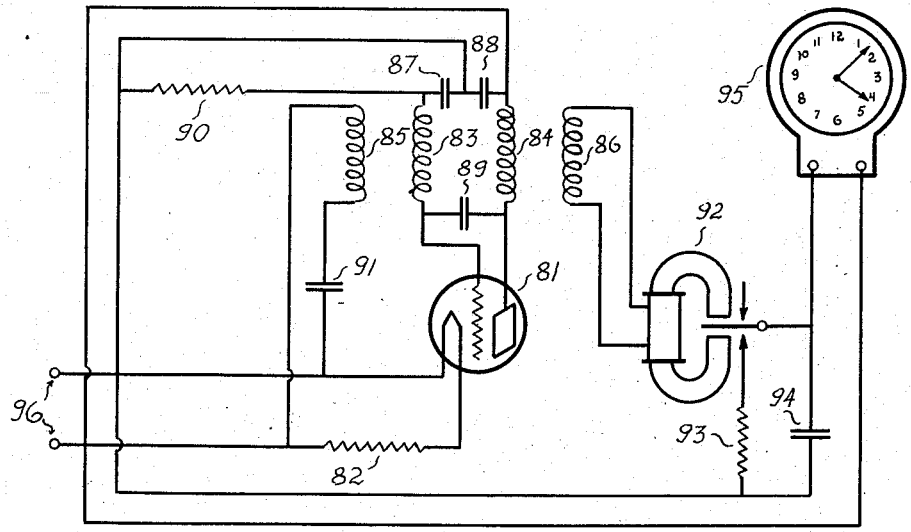
Fig. 3 is a diagram showing a device similar to that represented in Fig. 2, with modification in the design of the vibrating relay circuit.

The system shown in Fig. 3 is similar to that shown in Fig. 2, except that the circuit associated with the vibrating relay is further modified. Direct current power is supplied to the terminals 96. The electronic oscillator tube 81 has its heater, in series with a non-inductive resistance 82, connected to said terminals 96, substantially as indicated.

Associated with said electronic oscillator tube 81, inductive impedances 83 and 84, blocking condensers 87 and 88 and condenser 89, connected between the plate and the grid circuits of said tube 81, comprise an oscillator circuit, which, in combination with said tube 81 and other parts coupled therewith, is tuned to very nearly the 120 cycle frequency.

In the apparatus represented by the diagram of the figure, coils 83, 84, 85 and 86 are inductively coupled to each other, and the four-winding transformer thus formed might be of either the air core or of the iron core type, and can have nearly 100 percent or any other percentage couplings between the aforementioned four windings. The plate potential of said oscillator tube 81 is supplied from the positive terminal of the line, through the ohmic resistance of the inductive impedance winding 84, and the grid is connected to the cathode circuit through the grid leak resistor 90 in series with the winding 83, substantially as indicated.

The midpoint between the blocking condensers 87 and 88 is grounded to the cathode. The series circuit formed by the winding 85 and the blocking condenser 91 is connected across the power supply. Transformer winding 86 is connected across the coil of the polarized relay 92. Said polarized relay 92 forms part of a circuit which operates in accordance with the general principle described in connection with the diagram of Fig. 2. In the diagram of Fig. 3, direct current power is impressed across the series circuit formed by the condenser 94 and the synchronous electric clock 95, of the usual 60 cycle type. The inductive impedance incorporated in the field of the synchronous motor which forms part of said clock 95, serves as the inductive impedance 78 of Fig. 2 in stepping up the voltage, in combination with said condenser 94. Referring to the diagram of Fig. 3, the 120 cycle signal impressed by the transformer winding 86 upon the coil of the polarized relay 92, causes said polarized relay 92 to intermittently connect the non-inductive resistor 93 across the condenser 94. The shorting of said condenser 94 by said relay 92, at the rate of 120 times per second, and the consequent discharging of said condenser 94 through said non-inductive resistor 93, causes a 120 cycle alternating current electromotive force to be impressed upon the circuit formed by the said condenser 94, the synchronous electric clock 95 and the power source.

When the value of the capacity of the condenser 94 is properly chosen as related to the inductive impedance of the synchronous electric clock 95, a condition arises, which is comparable to resonance in an alternating current system, at which point, the R. M. S. value of the 60 cycle alternating current component of the voltage existing between the terminals of the clock 95 might be in excess of the direct current voltage supplied by the power source and, otherwise, can be adjusted to any desired value by varying the constants of the circuit.

Inasmuch as in this arrangement, direct current is superimposed upon alternating current, in the synchronous motor winding of the clock 95, the core of the synchronous motor of said clock is polarized, and the 120 cycle alternating current power which is supplied to said synchronous motor results in the rotor of said synchronous motor receiving 60 impulses per second. Therefore clock 95 will indicate true time.

Figure 4:
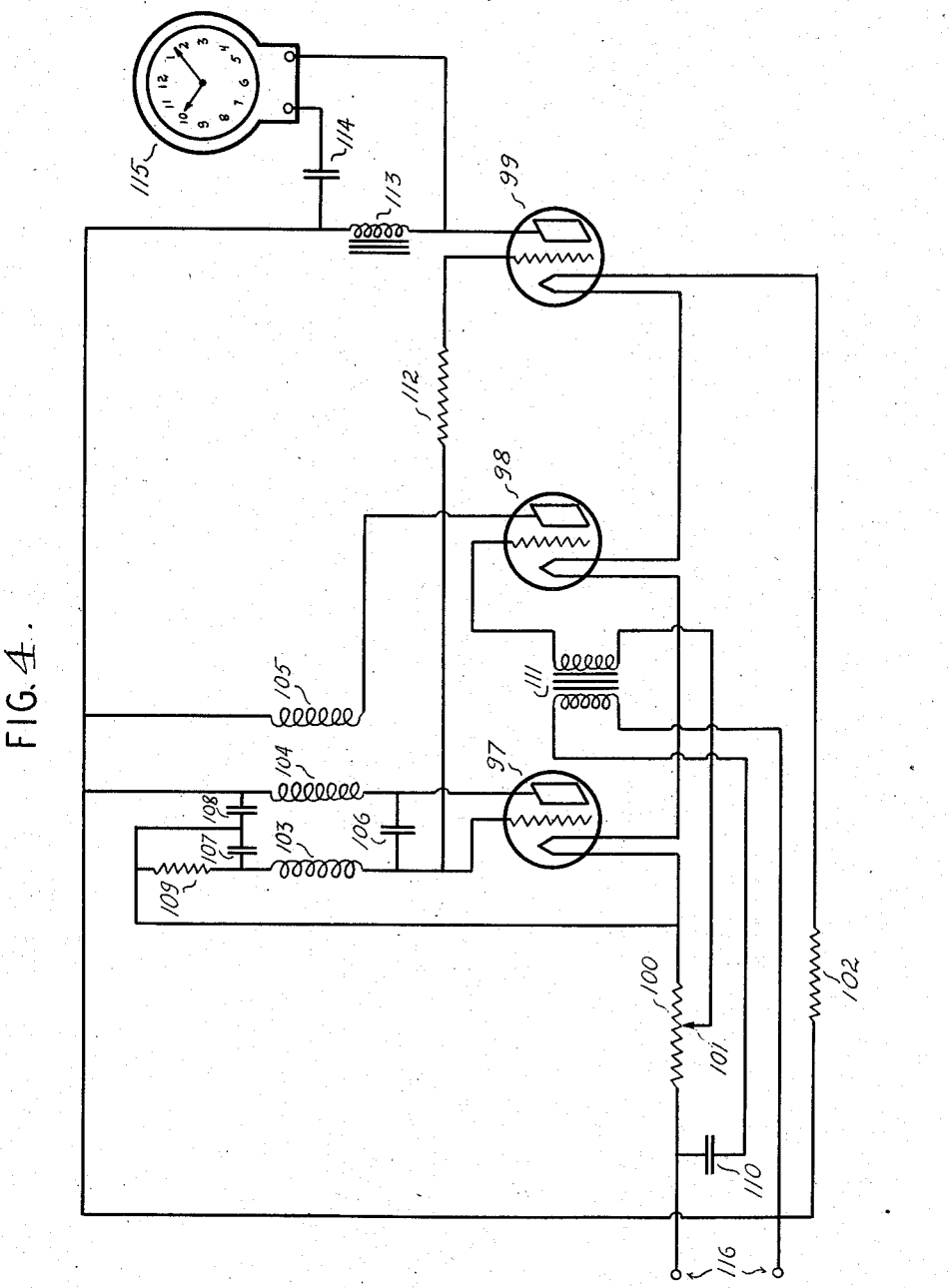
Fig. 4 is a diagrammatical illustration of a device similar to that represented on Fig. 1, and employing two extra stages of amplification utilizing electronic tubes.

In Fig. 4 a further modification is shown, including an electronic output tube which is used instead of the vibrating relay amplifier and an electronic amplifier tube which serves to amplify the ripple or alternating current component of the direct current power. Direct current power is supplied to terminals 116. The electronic oscillator tube 97, amplifier tube 98 and output tube 99 have their respective heater circuits connected in series. Series non-inductive resistances 100 and 102 serve to limit the filament current of the above tubes to the normal value.

Associated with said oscillator tube 97, blocking condensers 107 and 108, condenser 106 and inductive impedances 103 and 104, connected, as indicated by the diagram of the drawings, between the plate and the grid circuits of said oscillator tube 97, comprise the oscillator circuit, tuned to very nearly the 60 cycle frequency. Coils 103, 104 and 105 are inductively coupled to each other, said coil 104 being the plate circuit of said tube 97.

The plate potential is supplied to the oscillator tube 97 from the positive terminal of the line, through the ohmic resistance of the inductive impedance winding 104, and the grid is connected to the cathode circuit through the grid leak resistor 109 in series with the winding 103. The mid-point between the blocking condensers 107 and 108 is grounded to the cathode.

The series circuit formed by the primary of the transformer 111 and the blocking condenser 110 is connected across the power supply 116, and the secondary of said transformer 111 is connected at one extremity to the grid of the amplifier tube 98, and, by the other extremity, to the contact 101 of the resistor 100, said arrangement providing the negative grid bias of the amplifier tube 98, substantially as indicated by the diagram of the drawings.

Coil 105 is in the plate circuit of said amplifier tube 98, and is connected at one extremity to the positive terminal of the line, thus providing the plate potential of said amplifier tube 98.

The alternating current component, or ripple frequencies present in the direct current power, are impressed upon the primary terminals of the transformer 111, after passing through the high capacity blocking condenser 110, and are impressed by the secondary of said transformer 111 upon the grid of the amplifier tube 98. After being amplified by said amplifier tube 98, said alternating current component of the direct current power passes through the coil 105. Due to the said coil 105 being inductively coupled to coils 103 and 104 of the oscillator circuit, the different frequency signal in the coil 105 affects the period of oscillation of the circuit of the oscillator tube 97, as heretofore explained.

The grid of said oscillator tube 97 is connected to the grid of the output tube 99 through the non-inductive resistance 112 which serves to limit the voltage input to the grid of said output tube 99, and, likewise, to isolate the oscillating circuit of the tube 97 from the output or clock terminals of the apparatus.

An inductive impedance 113 is connected to the plate circuit of said tube 99, and connects at the other extremity to the positive terminal of the direct current power supply, as illustrated.

The circuit formed by a synchronous electric clock 115, of the usual 60 cycle alternating current type and a blocking condenser 114, in series, is connected across the said inductive impedance 113, in parallel with the same, substantially as indicated by the diagram of the drawings.

The 60 cycle alternating current output of the output tube 99 is substantially blocked by the inductive impedance 113, and passes through the said series circuit formed by the synchronous electric clock 115 and the blocking condenser 114.

Figure 5:
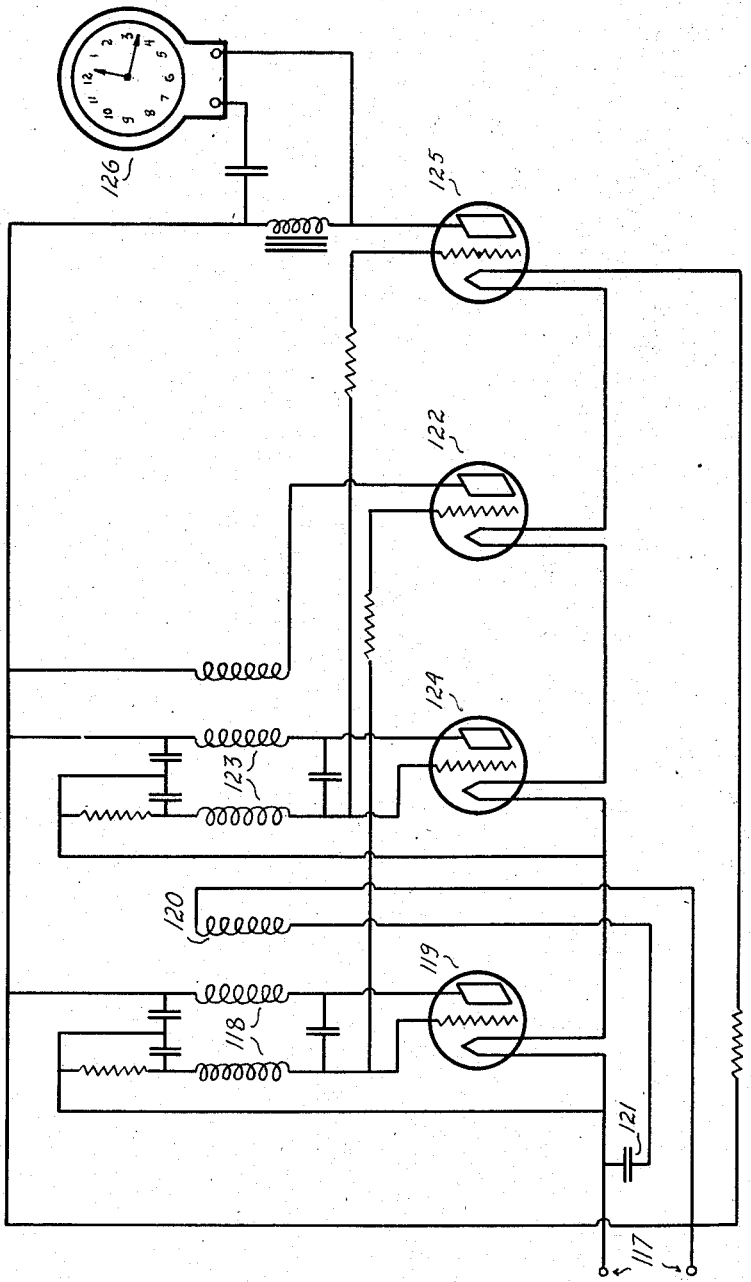
Fig. 5 is a diagram showing an improved unit, utilizing two oscillator circuits.

In Fig. 5 a further modification including an extra oscillator is shown. Instead of having the ripple frequency signal to influence or "pull-in" the oscillations of the 60 cycle oscillator, which is coupled to the clock, the ripple frequency signal is made to influence or synchronize with the oscillations of an auxiliary oscillator. The signal impressed upon the 60 cycle oscillator by this auxiliary oscillator is then made to influence or "pull-in" the oscillations of said 60 cycle oscillator. Such an arrangement is advantageous as input at constant voltage is fed to the means influencing the 60 cycle oscillator frequency, while the auxiliary oscillator which is coupled with the ripple component of the direct current power can have its own frequency adjusted to equal the frequency of said ripple component, or a convenient multiple or fraction of the same, thus providing the most stable and secure conditions of coupling to said ripple component of the direct current power. In case the clock is run on the 25 cycle power system, the said auxiliary oscillator should be tuned to the 25 cycle frequency.

Direct current power is supplied to the terminals 117, and the ripple, or alternating current component of said power is impressed upon the oscillator circuit 118 of the auxiliary electronic oscillator tube 119 by the winding 120 which winding is inductively coupled to said circuit. Said winding 120 is connected, in series with a blocking condenser 121, across the power source, substantially as indicated by the diagram of the drawings, and the ripple frequency signal appearing in said winding 120 will influence or synchronize with the oscillations of the auxiliary oscillator 119.

The grid of said auxiliary oscillator 119 is shown coupled to the grid of an electronic amplifier 122. The output circuit of said amplifier 122 is inductively coupled to the oscillating circuit 123 of an electronic oscillator 124. Said oscillator 124 is tuned to substantially the 60 cycle frequency, and has its grid coupled to the grid of an electronic amplifier tube 125. The output circuit of said amplifier tube 125 is connected to a 60 cycle synchronous electric clock 126.

Figure 6:
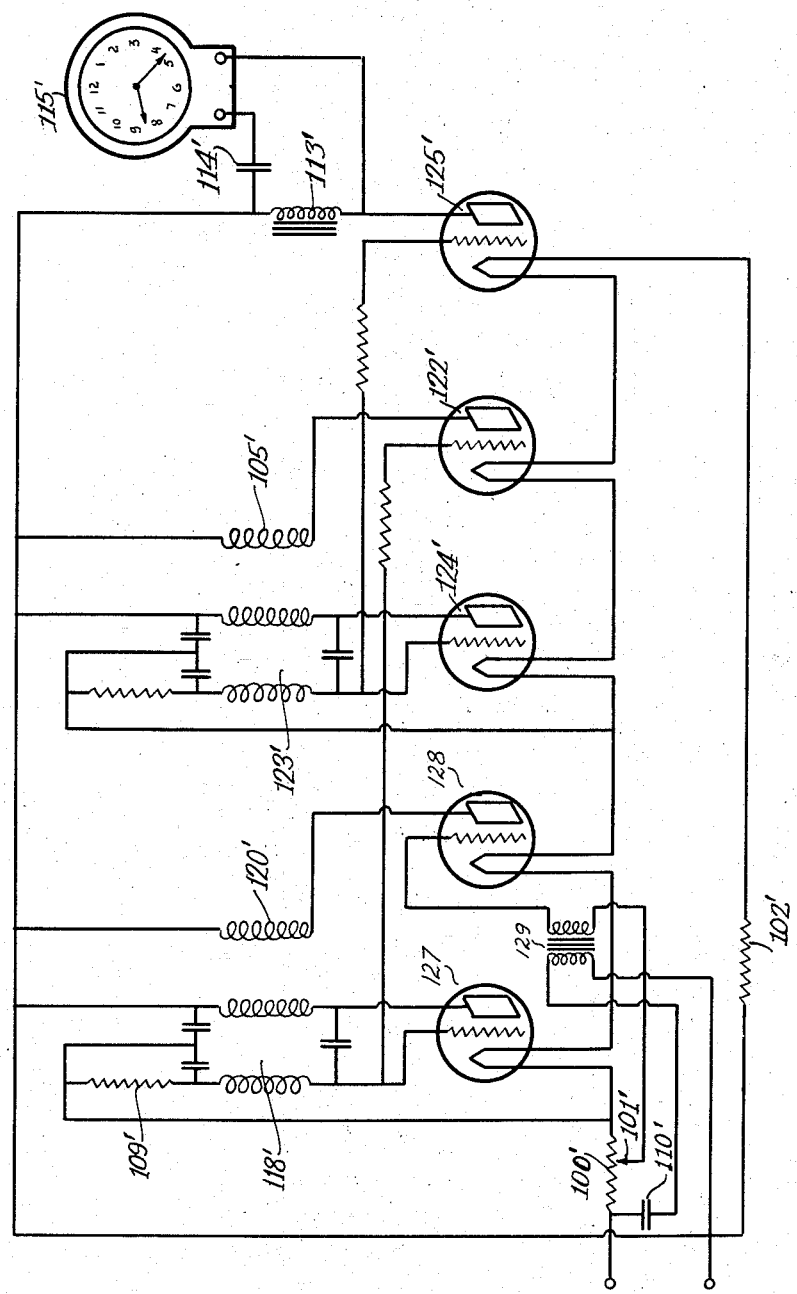
Fig. 6 is a diagram showing a device similar to that represented on Fig. 5 and utilizing an extra stage of amplification.

The system shown in Fig. 6 is similar to that shown in Fig. 5, except that the circuit of the auxiliary oscillator tube 127 is coupled to the ripple frequency signal through the circuit of the amplifier tube 128, the ripple frequency signal being impressed upon the grid of said amplifier tube 128 through the transformer 129. The parts in this figure corresponding to those shown in Fig. 5 are correspondingly primed and operate in the manner described above.

Figure 7:
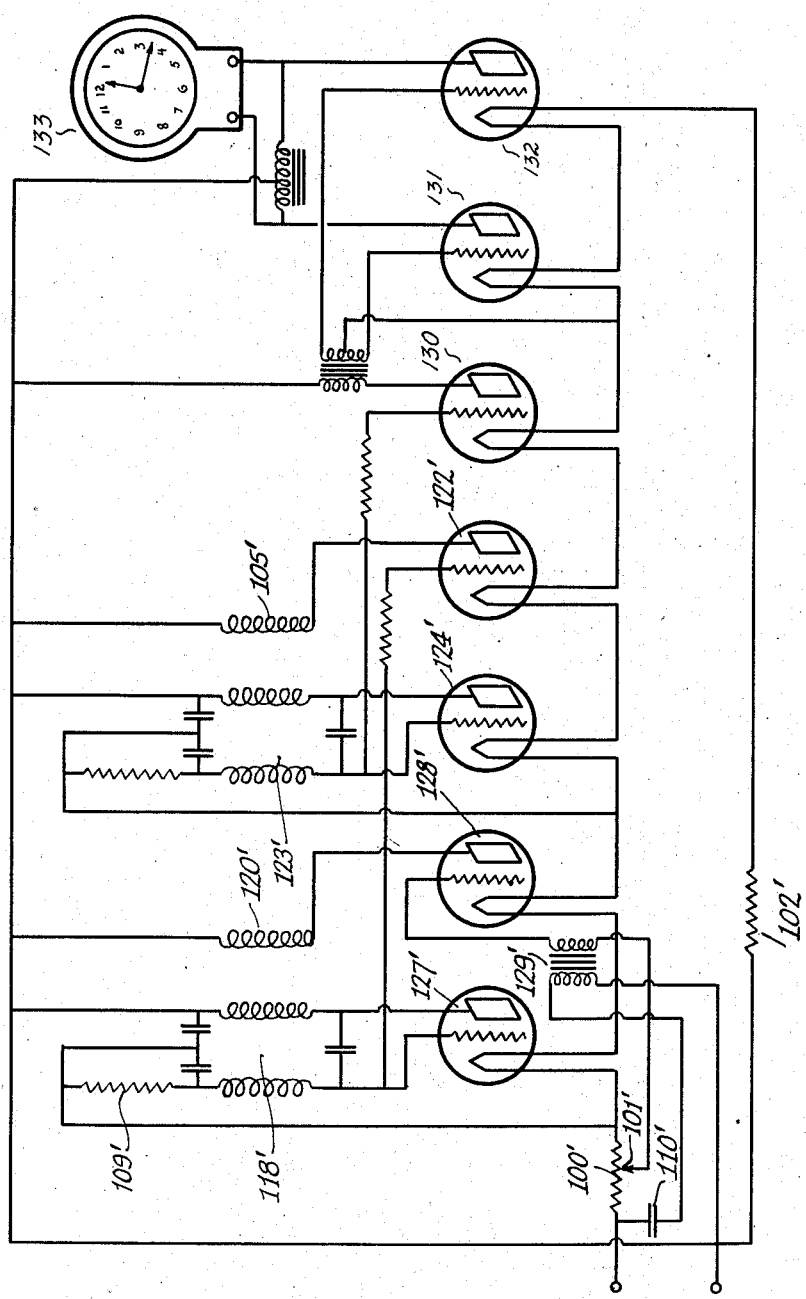
Fig. 7 is a diagram showing a device similar to that represented on Fig. 6 and utilizing a push-pull amplifier in the output circuit.

The system shown in Fig. 7 is similar to that shown in Fig. 6, except that the electronic output tube 130, instead of being connected directly to the synchronous electric clock, has its output circuit coupled to the grids of the electronic amplifier tubes 131 and 132, in a push-pull amplifier arrangement, while the output circuit of said push-pull amplifier is connected to the synchronous electric clock 133. The elements of the circuit prior to the last stage correspond to those designated in Fig. 6 and operate in the manner described above.

Having thus described my invention, therefore I claim:

1. The method of actuating an alternating current timing device from a direct current power circuit having superposed thereupon a harmonic frequency ripple, which comprises generating oscillations of a frequency suitable for controlling the timing device, and stabilizing the frequency of the oscillations by superposing the harmonic ripple thereon.

2. The method of actuating an alternating current timing device from a direct current power circuit having superposed thereupon a harmonic frequency ripple, which comprises generating oscillations of a frequency suitable for controlling the timing device, said last-mentioned frequency bearing a simple fractional relationship to the frequency of said harmonic ripple, and stabilizing the frequency of the oscillations by superposing the harmonic ripple thereon.

3. The method of actuating an alternating current timing device from a direct current power circuit having superposed thereupon a harmonic frequency ripple, which comprises generating oscillations of a frequency suitable for controlling the timing device, said last-mentioned frequency bearing a simple fractional relationship to the frequency of said harmonic ripple, deriving oscillations from said harmonic ripple, combining said two types of oscillations to effect a mutual stabilization therebetween tending to maintain said simple fractional relationship constant whereby said timing device is actuated uniformly uninfluenced by normally occurring disturbing conditions in said direct current power circuit.

4. The method of actuating an alternating current timing device from a direct current power circuit having superposed thereupon a harmonic frequency ripple, which comprises generating oscillations of a frequency suitable for controlling the timing device, said last-mentioned frequency approximating a simple fractional relationship to the frequency of said harmonic ripple, deriving oscillations from said harmonic ripple, combining said two types of oscillations to entrain said generated oscillations and to maintain said oscillations at a fixed frequency whereby said timing device is actuated uniformly uninfluenced by normally occurring disturbing conditions in said direct current power circuit.

5. The method of actuating an alternating current translating device from a direct current power circuit having superposed thereupon a harmonic frequency ripple, which comprises generating alternating current energy which normally at least approximates the frequency required by the translating device, modifying the generated frequency by the harmonic frequency ripple to stabilize the frequency of the generated alternating current to the value required by the translating device, and controlling the translating device by the alternating current energy of stabilized frequency.

6. The method of actuating an alternating current translating devices from a direct current power circuit having superposed thereupon a harmonic frequency ripple, which comprises generating alternating current energy which normally is at a frequency slightly detuned from that required by the translating device, modifying the generated frequency by the harmonic frequency ripple to stabilize the frequency of the generated alternating current to the value required by the translating device, and controlling the translating device by the alternating current energy of stabilized frequency.

7. The method of actuating an alternating current translating device from a direct current power circuit having superposed thereupon a harmonic frequency ripple which comprises generating alternating current energy which normally at least approximates the frequency required by the translating device, modifying the generated frequency by the harmonic frequency ripple to stabilize the frequency of the generated alternating current to the value required by the translating device, controlling the translating device by the alternating current energy of stabilized frequency, charging a condenser by the direct current power circuit, and intermittently discharging the condenser by the operation of said translating device through a circuit including a second translating device.

8. The method of actuating an alternating current timing device from a direct current power circuit having superposed thereupon a timed-frequency harmonic ripple which comprises generating alternating current energy which normally at least approximates the frequency required by the timing device, superposing the timed-frequency harmonic ripple upon the generated frequency to stabilize the frequency of the generated alternating current to the value required by the timing device, and controlling the timing device by the alternating current energy of stabilized frequency.

9. The method of actuating an alternating current timing device from a direct current power circuit having superposed thereupon a timed-frequency harmonic ripple which comprises generating alternating current energy at a predetermined frequency, superposing the timed frequency harmonic ripple upon the generated frequency to stabilize the frequency of the generated alternating current, controlling a translating device by the stabilized alternating current energy, charging a condenser by the direct current power circuit, intermittently discharging the condenser by the operation of said translating device, and controlling the timing device by the condenser discharges through a circuit including the timing device.

10. The method of actuating an alternating current timing device from a direct current power circuit having superposed thereupon a harmonic frequency ripple which comprises generating auxiliary oscillations, deriving oscillations from the harmonic ripple, superposing said last-mentioned oscillations upon said auxiliary oscillations to effect a stabilization thereof, amplifying said stabilized auxiliary oscillations, generating main oscillations of a frequency suitable for controlling the timing device, stabilizing said last-mentioned oscillations by superposing thereupon the stabilized auxiliary oscillations, and controlling the timing device by said last-mentioned oscillations.

11. The method of actuating an alternating current timing device from a direct current power circuit having superposed thereupon a harmonic frequency ripple which comprises generating a plurality of oscillations of different frequencies, deriving oscillations from said harmonic ripple and superposing said last-mentioned oscillations upon one of the first-mentioned oscillations of predetermined frequency to effect a stabilization thereof, successively superposing the stabilized oscillations of predetermined frequency upon the next successive source of said first-mentioned oscillations to effect a stabilization thereof, and controlling the timing device by the last source of stabilized oscillations.

12. In a direct current power system having superposed thereupon a harmonic frequency ripple, tuned circuit means for generating an alternating current of predetermined frequency, a synchronously operating electric clock mechanism energized from said tuned circuit means, and means cooperating with said tuned circuit means interposed between said system and said clock mechanism for nullifying normally occurring disturbing effects in said system upon said clock mechanism.

13. In a direct current power system having superposed thereupon a harmonic frequency ripple, tuned circuit means for deriving an alternating current of predetermined frequency from said direct current system, a synchronously operating electric clock mechanism energized from said tuned circuit means, and means cooperating with said tuned circuit means interposed between said system and said clock mechanism for nullifying normally occurring disturbing effects in said system upon said clock mechanism.

14. In a direct current power system having superposed thereupon a harmonic frequency ripple, an alternating current motor mechanism adapted to operate at a predetermined frequency, an oscillation generator comprising a circuit tuned at least in close proximity to said predetermined frequency, means for coupling said harmonic frequency ripple to said circuit for stabilizing the generated oscillations at said predetermined frequency, and means for coupling said stabilized source of oscillation with said motor mechanism.

15. In a direct current power system having superposed thereupon a harmonic frequency ripple, an alternating current motor mechanism adapted to operate at a predetermined frequency, an oscillation generator comprising an electronic device and an electrical circuit connected therewith, said circuit being adjusted to a frequency at least in close proximity to the predetermined frequency of the alternating current motor mechanism, coupling means connected with said direct current power system for transferring the harmonic ripple therefrom to said electrical circuit to exercise a stabilizing effect on said oscillation generator, and coupling means intermediate said electrical circuit and said motor mechanism.

16. In a direct current power system having superposed thereupon a harmonic frequency ripple, an alternating current motor mechanism adapted to operate at a predetermined frequency, an oscillation generator comprising an electronic device energized from said direct current power system and an electrical circuit connected therewith, said circuit being adjusted to a frequency at least in close proximity to the predetermined frequency of the alternating current motor mechanism, coupling means connected with said direct current power system for transferring the harmonic ripple therefrom to said electrical circuit to exercise a stabilizing effect on said oscillation generator, and coupling means intermediate said electrical circuit and said motor mechanism.

17. The combination claimed in claim 15 wherein said coupling means comprises a polarized relay controlled by said oscillation generator, a condenser connected with said direct current power system adapted to be intermittently discharged by the operation of said polarized relay, and an electrical circuit of predetermined constants connected between said condenser and the alternating current motor mechanism.

18. In a direct current power system having superposed thereupon a harmonic frequency ripple; an alternating current timing device adapted to operate at a predetermined frequency, an oscillation generator comprising an electronic device energized from said direct current power system and an electrical circuit connected therewith, means connected with said direct current power system for coupling the harmonic frequency ripple to said electrical circuit to effect a stabilization thereof, and coupling means intermediate said electrical circuit and said timing device.

19. In a direct current power system having superposed thereupon a harmonic frequency ripple; an alternating current timing device adapted to operate at a predetermined frequency, an auxiliary oscillation generator comprising an electronic device energized from said direct current power system and an electrical circuit connected therewith, means connected with said direct current power system for coupling the harmonic frequency ripple to said electrical circuit to effect a stabilization thereof, means for amplifying the stabilized auxiliary oscillations, a main oscillation generator comprising an electronic device energized from said direct current power system and an electrical circuit connected therewith, means for coupling the stabilized auxiliary oscillations to said last-mentioned electrical circuit to effect a stabilization of the main oscillations, and coupling means intermediate said last-mentioned electrical circuit and said timing device.

LEON THÉRÉMIN.